US009645911B2

United States Patent
Cheng (10) Patent No.: US 9,645,911 B2
(45) Date of Patent: May 9, 2017

(54) SYSTEM AND METHOD FOR DEBUGGING FIRMWARE/SOFTWARE BY GENERATING TRACE DATA

(71) Applicant: Insyde Software Corporation, Taipei (TW)

(72) Inventor: Ying Chin Cheng, Taipei (TW)

(73) Assignee: INSYDE SOFTWARE CORPORATION, Taipei (TW)

( * ) Notice: Subject to any disclaimer, the term of this patent is extended or adjusted under 35 U.S.C. 154(b) by 54 days.

(21) Appl. No.: 14/885,585

(22) Filed: Oct. 16, 2015

(65) Prior Publication Data

US 2016/0110281 A1 Apr. 21, 2016

(30) Foreign Application Priority Data

Oct. 17, 2014 (TW) .............................. 103135943 A (51) Int. Cl.
*G06F 11/00* (2006.01)
*G06F 11/36* (2006.01)

(52) U.S. Cl.
CPC ...... *G06F 11/3636* (2013.01); *G06F 11/3664* (2013.01)

(58) Field of Classification Search
CPC .......................... G06F 11/3636; G06F 11/3664
See application file for complete search history.

(56) References Cited

U.S. PATENT DOCUMENTS

| | | | |
|---|---|---|---|
| 7,996,686 B2 | 8/2011 | LeGendre et al. | |
| 8,533,678 B2* | 9/2013 | Halter | G06F 11/3648 712/227 |
| 8,561,033 B2 | 10/2013 | Aranguren et al. | |
| 2003/0051122 A1* | 3/2003 | Sato | G06F 11/28 712/227 |
| 2003/0074650 A1* | 4/2003 | Akgul | G06F 11/3624 717/129 |
| 2005/0289400 A1* | 12/2005 | Kimura | G06F 11/3636 714/45 |

* cited by examiner

*Primary Examiner* — Jason Bryan
(74) *Attorney, Agent, or Firm* — Muncy, Geissler, Olds & Lowe, P.C.

(57) ABSTRACT

A method for debugging firmware/software by generating trace data includes the following steps: running a debug module in a power-on stage in a test system, to record a load address and a branch instruction execution record set of a tested module into an area for temporary storage; accessing, by an analyzer, in an operating system stage in the area for temporary storage, the load address and the branch instruction execution record set and accessing a program debug symbol table, where the program debug symbol table is generated when source program code is compiled; and finding, by the analyzer, an original source file, a function name, and line numbers of executed codes from the program debug symbol table according to the load address and the branch instruction execution record set to generate an analysis report that includes a program execution path and a program code coverage.

12 Claims, 8 Drawing Sheets

SYSTEM AND METHOD FOR DEBUGGING FIRMWARE/SOFTWARE BY GENERATING TRACE DATA

BACKGROUND

Technical Field

The present invention relates to the field of computer technologies, and in particular, to a system and a method for debugging firmware/software by generating trace data, a recording medium, and a computer program product.

Related Art

Modern software is written into a system in a modular manner. Each module has a specific function, and has a specific interface for interacting with another module. In this manner, each module may be written and separately tested, so that multiple developers work in parallel in a relatively large software system. Modular software also favorably allows an existing module to be combined into multiple larger systems. One difficulty of the modular software is that, each module may have different writers or be provided by different objects having different program agreements. Therefore, it is an indispensable work to test interaction between software modules to ensure that the behavior of a software system is as expected.

A debug system for testing interaction between software modules provides a capability for generating system trace, which records related information generated by execution path changing of all program executed by a software system or module. For example, U.S. Pat. No. 7,996,686 B2 filed on Aug. 9, 2011 A.D. and U.S. Pat. No. 8,561,033 B2 filed on Oct. 15, 2013 A.D. and the like disclose that a debug system is used to trace and record related information generated by all program execution path changing performed by a software system or module.

In the foregoing patent applications and the prior art, debug trace of a software system or module is performed in an operating system stage, that is, debug trace can be performed only on software or a module executed in an operating system stage. The foregoing patent applications and the prior art cannot perform debug trace on a module of an embedded system such as the basic input output system (BIOS) or Android, and therefore a new debug solution needs to be provided to perform debug trace on a module of an embedded system.

SUMMARY

In view of the foregoing problem, an objective of the present invention is to provide a system and a method for debugging firmware/software by generating trace data, a recording medium, and a computer program product, which can perform debug trace on a module of an embedded system such as the BIOS or Android, so as to achieve a new solution of performing debug trace on a module of an embedded system, that is, without changing program code of the module of the embedded system, turning on or off of a branch trace function can be controlled in real time from a remote end, and a size of storage space is set; a program designer may trace and record a power-on procedure of the embedded system for one or more interested modules by using limited storage space, and can perform data analysis in real time.

A first aspect of the present invention provides a method for debugging firmware/software by generating trace data, and the method includes the following steps:

running a debug tool program in a main control system, running a debug engine in a power-on stage in a test system to configure an area of a first memory used for temporary storage, and recording a load address and a branch instruction execution record set into the area for temporary storage, wherein the load address is an address of a module, which is loaded in the first memory, of an embedded system, and the branch instruction execution record set includes a plurality of branch instruction execution records that record addresses before and after a branch instruction is executed;

sending, by the main control system, a debug instruction to the test system, to collect the load address and the branch instruction execution record set in the area for temporary storage of the test system and store the load address and the branch instruction execution record set in a second memory;

accessing, by an analyzer of the main control system, the load address, the branch instruction execution record set, and a program debug symbol table in the second memory, wherein the program debug symbol table is generated when source program code is compiled; and finding, by the analyzer, an original source file, a function name, and line numbers of executed codes from the program debug symbol table according to the load address and the branch instruction execution record set to generate an analysis report, wherein the analysis report includes a program execution path and a program code coverage.

A second aspect of the present invention provides a system for debugging firmware/software by generating trace data, and the system includes:

a test system, including:
 a first memory;
 a flash memory, for storing an embedded system; and
 a first central processing unit (CPU), for running a debug engine in a power-on stage to configure an area of the first memory used for temporary storage, recording a load address and a branch instruction execution record set into the area for temporary storage, and receiving a debug instruction to transfer the load address and the branch instruction execution record set in the area for temporary storage, wherein the load address is an address of a module, which is loaded in the first memory, of the embedded system, and the branch instruction execution record set includes a plurality of branch instruction execution records that record addresses before and after a branch instruction is executed; and a main control system, including:
 a second memory, for storing a program debug symbol table and source program code of the embedded system, wherein the program debug symbol table is generated when the source program code is compiled; and
 a second CPU, for running a debug tool program to send the debug instruction to the test system and to collect the load address and the branch instruction execution record set in the area for temporary storage of the test system, running an analyzer to access the load address, the branch instruction execution record set, and the program debug symbol table in the second memory, and finding an original source file, a function name, and line numbers of executed codes from the program debug symbol table according to the load address and the branch instruction execution record set to generate an analysis report, wherein the analysis report includes a program execution path and a program code coverage.

A third aspect of the present invention provides a method for debugging firmware/software by generating trace data, and the method includes the following steps:

running a debug module in a power-on stage in a test system, to configure an area of a memory used for temporary storage;

running, by the test system, a module of an embedded system, and recording a load address and a branch instruction execution record set of the module into the area for temporary storage, wherein the load address is an address of the module loaded in the memory, and the branch instruction execution record set includes a plurality of branch instruction execution records that record addresses before and after a branch instruction is executed;

accessing, by an analyzer of the test system in an operating system stage, the load address and the branch instruction execution record set in the area for temporary storage and a program debug symbol table in the memory, wherein the program debug symbol table is generated when the source program code is compiled; and finding, by the analyzer, an original source file, a function name, and line numbers of executed codes from the program debug symbol table according to the load address and the branch instruction execution record set to generate an analysis report, wherein the analysis report includes a program execution path and a program code coverage.

A fourth aspect of the present invention provides a system for debugging firmware/software by generating trace data, and the system includes:

a memory, for storing a program debug symbol table and source program code of an embedded system, wherein the program debug symbol table is generated when the source program code is compiled;

a flash memory, for storing an embedded system; and a CPU, for running a debug module in a power-on stage to configure an area of the memory used for temporary storage, running a module of an embedded system, recording a load address and a branch instruction execution record set into the area for temporary storage, running an analyzer in an operating system stage in a test system, to access the load address and the branch instruction execution record set in the area for temporary storage, and access the program debug symbol table in the memory, and finding an original source file, a function name, and line numbers of executed codes from the program debug symbol table according to the load address and the branch instruction execution record set, to generate an analysis report that includes a program execution path and a program code coverage, wherein the load address is an address of the module loaded in the memory, and the branch instruction execution record set includes a plurality of branch instruction execution records that record addresses before and after a branch instruction is executed.

A fifth aspect of the present invention provides a recording medium storing a program, after a system for debugging firmware/software by generating trace data loads the program from the recording medium and runs the program, the method of the first aspect or the third aspect of the present invention is implemented.

A sixth aspect of the present invention provides a computer program product storing a program, after a system for debugging firmware/software by generating trace data loads the program from the computer program product and runs the program, the method of the first aspect or the third aspect of the present invention is implemented.

DETAILED DESCRIPTION

To make a person of ordinary skill in the art understand the present invention better, constitution content and achieving effects of the present invention are described in detail by using several preferred embodiments of the present invention with reference to the accompanying drawings.

The present invention performs debug trace on a module of an embedded system such as the BIOS or Android. For convenience of description, in all the following embodiments, the BIOS is used to describe the technology of the present invention, but is not intended to limit the right scope of the present invention.

Figure 1:
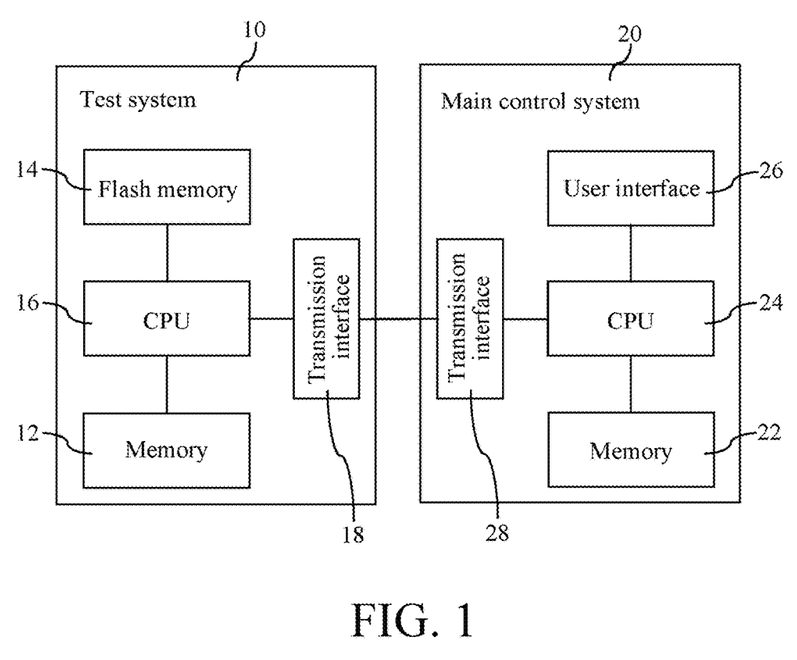
FIG. 1 is a block diagram of a system for debugging firmware/software by generating trace data according to a first embodiment of the present invention.

FIG. 1 is a block diagram of a system for debugging firmware/software by generating trace data according to a first embodiment of the present invention. In FIG. 1, the system for debugging firmware/software by generating trace data includes a test system 10 and a main control system 20.

The test system 10 includes a memory 12, a flash memory 14, a CPU 16, and a transmission interface 18. The main control system 20 includes a memory 22, a CPU 24, a user interface 26, and a transmission interface 28.

In the test system 10, the flash memory 14 stores the BIOS. In a power-on stage, without needing to change program code of a module of the BIOS, the CPU 16 runs a debug engine to configure an area (not shown) of the memory 12 used for temporary storage, traces and records a power-on procedure of the BIOS by using limited storage space, connects the main control system 20 to the test system 10, and records a load address and a branch instruction execution record set into the area for temporary storage, wherein the load address is an address of the module, which is loaded in the memory 12, of the BIOS, and the branch instruction execution record set includes a plurality of branch instruction execution records that record addresses before and after a branch instruction is executed.

The CPU 16 receives, by using the transmission interface 18, a debug instruction that is transferred by the main control system 20, and the CPU 16 transfers the load address and the branch instruction execution record set of the module in the area for temporary storage to the main control system 20 according to the debug instruction.

Branch trace store (BTS) is a hardware auxiliary debug function that is widely provided by an Intel Corporation CPU at present. Simply put, a CPU stores related information of a branch instruction (jump/jxx/call/int/ect.) that is actually executed by the module. The CPU generally stores a source address and a target address of each branch instruction.

In the main control system 20, the memory 22 stores a program debug symbol table and source program code of the BIOS, wherein the program debug symbol table is generated when the source program code is compiled. A program database (PDB) is a dedicated file format that is developed by Microsoft Company for storing debug information of related programs (for example, program modules such as DLL and EXE).

The CPU 24 runs a debug tool program, a user selects a to-be-debugged module on debug selection options displayed on the user interface 26, to generate a debug instruction corresponding to the to-be-debugged module, and the CPU 24 sends the debug instruction to the test system 10 by using the transmission interface 28. In this way, turning on or off of a branch trace function can be controlled in real time from a remote end, and a program designer may select an interested module on the debug selection options to make a record, and can perform data analysis in real time.

The CPU 24 runs an analyzer, and by using the transmission interface 28, the CPU 24 collects the load address and the branch instruction execution record set in the area for temporary storage of the test system 10 and accesses a program debug symbol table in the memory 22, and finds an original source file, a function name, and line numbers of executed codes from the program debug symbol table according to the load address and the branch instruction execution record set to generate an analysis report, wherein the analysis report includes a program execution path and a program code coverage. The user may view and analyze the analysis report displayed on the user interface 26.

Figure 2:
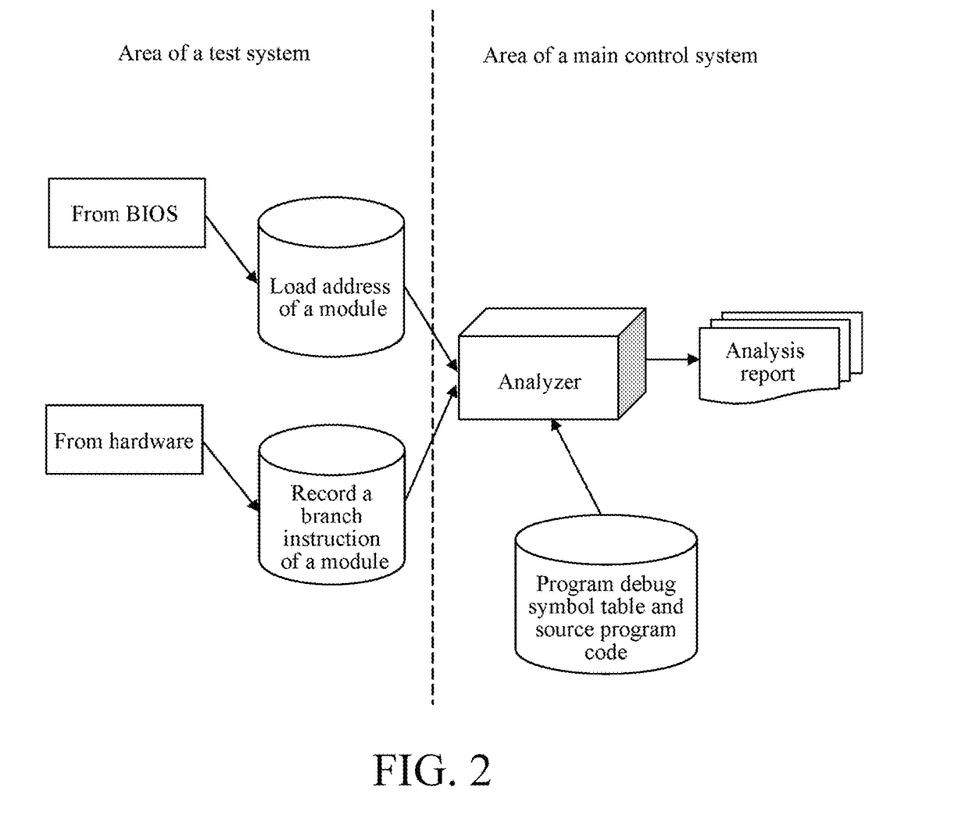
FIG. 2 is a schematic diagram of software implementation for debugging firmware/software by generating trace data according to the first embodiment of the present invention.

FIG. 2 is a schematic diagram of software implementation for debugging firmware/software by generating trace data according to the first embodiment of the present invention. Refer to the components of FIG. 1 when process steps of FIG. 2 are described.

Figure 3:
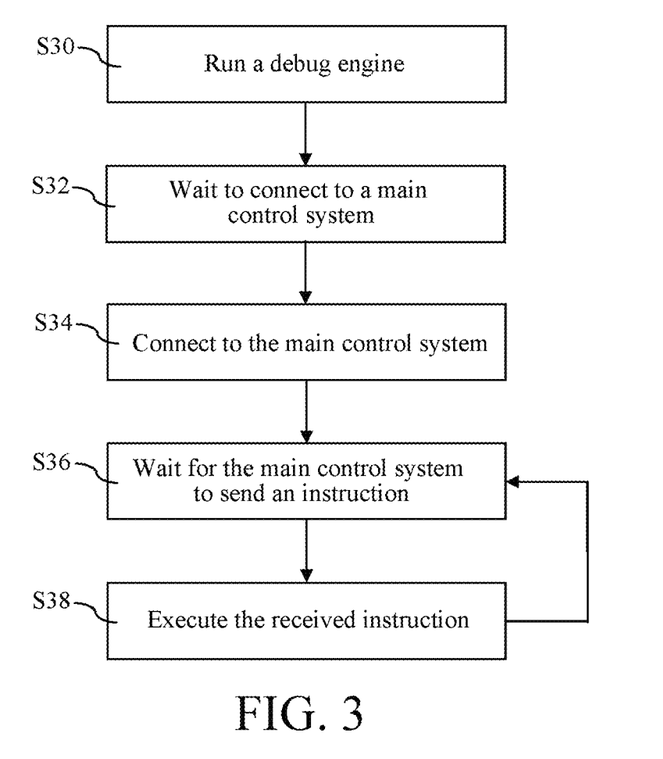
FIG. 3 is a flowchart of steps of performing debugging by a test system according to the first embodiment of the present invention.

In FIG. 2, in an area of a test system, the CPU 16 runs a debug engine in a power-on stage, and when the program is run in software, the test system 10 implements steps shown in FIG. 3, which is a flowchart of steps of performing debugging by a test system according to the first embodiment of the present invention.

In FIG. 3, in the area of the test system, the CPU 16 of the test system 10 runs a debug engine in a power-on stage to configure an area of the memory 12 used for temporary storage, traces and records a power-on procedure of the BIOS by using limited storage space, connects the main control system 20 to the test system 10, and records a load address and a branch instruction execution record set into the area for temporary storage, wherein the load address is an address of a tested module, which is loaded in the memory 12, of the BIOS, and the branch instruction execution record set includes a plurality of branch instruction execution records that record addresses before and after a branch instruction is executed (Step S30).

The CPU 16 of the test system 10 runs a power-on program, and the CPU 16 waits to connect to the main control system 20 (Step S32). The CPU 24 of the main control system 20 sends command to connect the test system by using the transmission interface 28 (Step S34).

The test system 10 that has connected to the main control system 20 waits for the main control system 20 to send a debug instruction (Step S36). When the CPU 16 of the test system 10 receives, by using the transmission interface 18, the debug instruction sent by the main control system 20, the CPU 16 runs a corresponding program of the debug instruction; for example, the CPU 16 runs a tested module, records a load address and a branch instruction execution record set of the tested module into the area for temporary storage, and the like (Step S38). After execution of Step S38 ends, go back to Step S36 again to implement a step in which the test system 10 waits for the main control system 20 to send a debug instruction.

Referring to FIG. 2 again, in the area of the main control system, the CPU 24 of the main control system 20 runs a debug tool program to generate a debug instruction, and sends the debug instruction to the test system 10 by using the transmission interface 28, and the CPU 24 collects, by using the transmission interface 28, the load address and the branch instruction execution record set of the module that are stored in the area for temporary storage of the test system 10, and stores the load address and the branch instruction execution record set into the memory 22. When the program is run in software, the main control system 20 implements steps shown in FIG. 4, which is a flowchart of steps of transferring an instruction by a main control system according to the first embodiment of the present invention.

Figure 4:
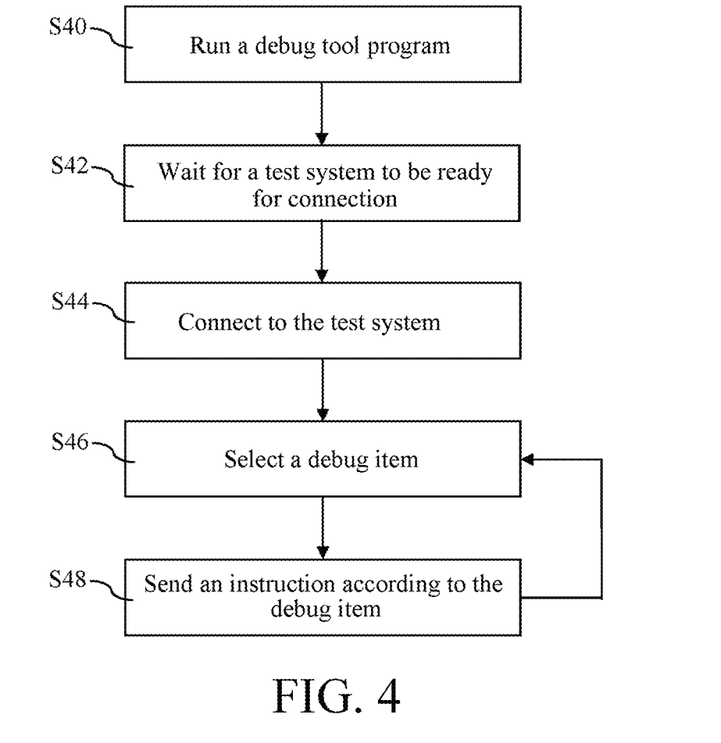
FIG. 4 is a flowchart of steps of transferring an instruction by a main control system according to the first embodiment of the present invention.

In FIG. 4, in the area of the main control system, the CPU 24 of the main control system 20 runs a debug tool program to display debug selection options on the user interface 26, to enable a user to select a to-be-debugged module (Step S40). The main control system 20 waits for the test system 10 to be ready for connection (Step S42). The CPU 24 of the main control system 20 sends command to connect the test system by using the transmission interface 28 (Step S44).

The user selects the to-be-debugged module on the user interface 26 (Step S46). For debugging an interested tested module, the user may select the to-be-debugged module on the debug selection options on the user interface 26, while the debug tool program run by the CPU 24 generates a debug instruction corresponding to the to-be-debugged module, and the CPU 24 transfers the debug instruction to the test system 10 by using the transmission interface 28 (Step S48). After execution of Step S48 ends, go back to Step S46 again to implement a step in which the user selects the to-be-debugged module on the debug selection options.

Referring to FIG. 2 again, in the area of the main control system, an analyzer of the main control system 20 accesses a load address, a branch instruction execution record set, and a program debug symbol table in the memory 22, wherein the program debug symbol table is generated when source program code is compiled. When the program is run in software, the main control system 20 implements steps shown in FIG. 5, which is a flowchart of steps of performing collecting by a main control system according to the first embodiment of the present invention.

Figure 5:
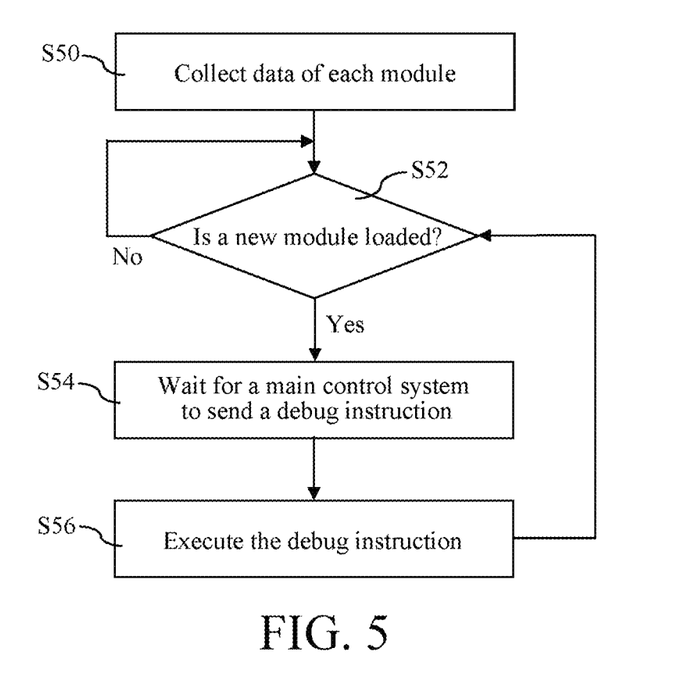
FIG. 5 is a flowchart of steps of performing collecting by a main control system according to the first embodiment of the present invention.

In FIG. 5, in the area of the main control system, a user sends a collection request on the user interface 26 of the main control system 20, so that the main control system 20 collects a load address and a branch instruction execution record set of a tested module in the test system 10 (Step S50).

Determine whether a new module is loaded in the test system 10 (Step S52). When a new module is loaded in the test system 10, the debug engine run by the CPU 16 of the test system 10 attaches and stores a load address and a branch instruction execution record set of the new module into an area for temporary storage.

If the test system 10 does not load a new module, continue to perform Step S52; if the test system 10 loads a new module, the main control system 20 transfers a debug instruction to the test system 10, and the control system 20 collects debug data of the load address and the branch instruction execution record set of the new module that are attached in the area for temporary storage of the test system 10 (Step S54). The main control system 20 stores the debug data into the memory 22 of the main control system 20 (Step S56).

Referring to FIG. 2 again, in the area of the main control system, an analyzer of the main control system 20 finds an original source file, a function name, and line numbers of executed codes from a program debug symbol table according to the load address and the branch instruction execution record set in the debug data to generate an analysis report, wherein the analysis report includes a program execution path and a program code coverage. When the program is run in software, the main control system 20 implements steps shown in FIG. 6, which is a flowchart of steps of performing analysis by a main control system according to the first embodiment of the present invention.

Figure 6:
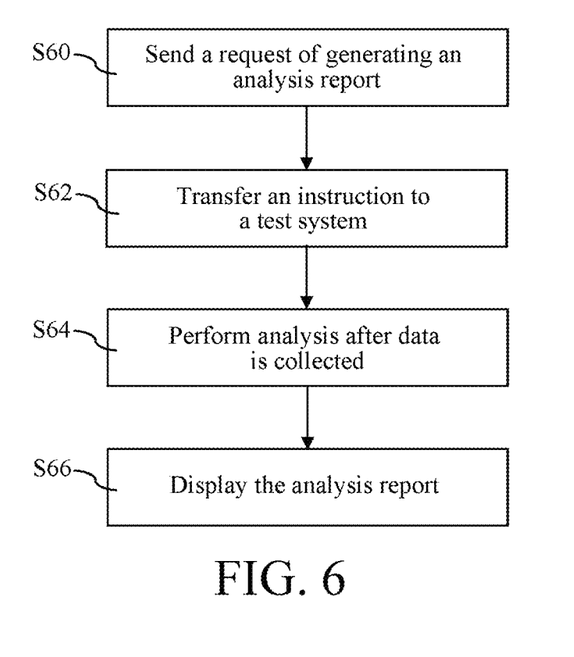
FIG. 6 is a flowchart of steps of performing analysis by a main control system according to the first embodiment of the present invention.

In FIG. 6, in the area of the main control system, a user sends an analysis request on the user interface 26 of the main control system 20, so that the main control system 20 collects and analyzes a load address and a branch instruction execution record set of a tested module in the test system 10 (Step S60).

The main control system 20 transfers a debug instruction corresponding to an interested tested module to the test system 10 according to the analysis request, and the main control system 20 collects debug data of a load address and a branch instruction execution record set of the tested module that are attached in an area for temporary storage of the test system 10 (Step S62).

After the main control system 20 collects the debug data, the CPU 24 of the main control system 20 runs an analyzer, and finds an original source file, a function name, and line numbers of executed codes from the program debug symbol table according to the load address and the branch instruction execution record set, to generate an analysis report that includes a program execution path and a program code coverage (Step S64). The analysis report is displayed on the user interface 26 of the main control system 20, to enable a user to view and analyze (Step S66).

In the first embodiment, the main control system 20 controls in real time a branch trace function of the test system 10 from a remote end. In another embodiment, a load address and a branch instruction execution record set that are stored in a memory of a test system may be temporarily stored in an external storage apparatus (such as a USB drive), and then the external storage apparatus is connected with a main control system, and the main control system collects and analyzes the load address and the branch instruction execution record set in an off-line manner, thereby implementing debugging firmware/software in an off-line manner by generating trace data of the test system.

Figure 7:
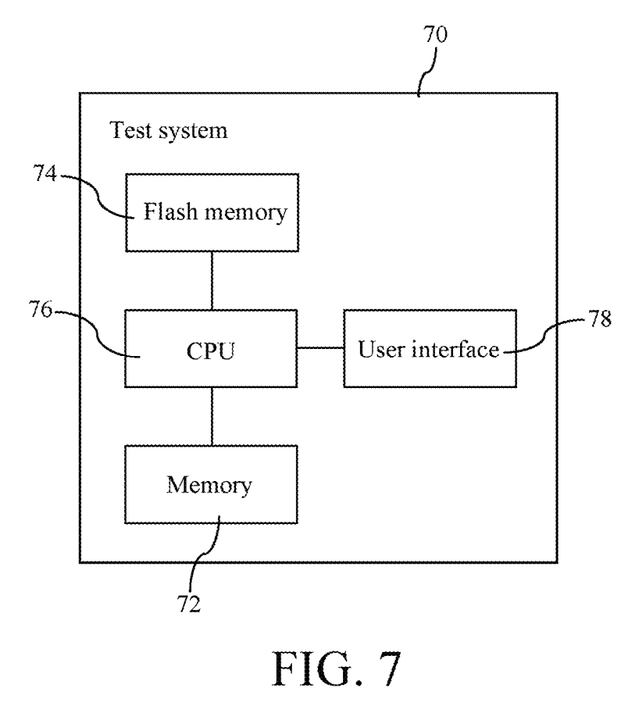
FIG. 7 is a block diagram of a test system for debugging firmware/software by generating trace data according to a second embodiment of the present invention.

FIG. 7 is a block diagram of a test system for debugging firmware/software by generating trace data according to a second embodiment of the present invention. In FIG. 7, the test system 70 for debugging firmware/software by generating trace data includes a memory 72, a flash memory 74, a CPU 76 and a user interface 78.

The flash memory 74 stores the BIOS; the memory 72 stores a program debug symbol table and source program code of the BIOS, wherein the program debug symbol table is generated when the source program code is compiled.

When the test system 70 is in a power-on stage, the CPU 76 runs a debug module to configure an area (not shown) of the memory 72 used for temporary storage, traces and records a power-on procedure of the BIOS by using limited storage space, and records a load address and a branch instruction execution record set of an interested tested module into the area for temporary storage, wherein the load address is an address of the tested module, which is loaded in the memory 72, of the BIOS, and the branch instruction execution record set includes a plurality of branch instruction execution records that record addresses before and after a branch instruction is executed.

When the test system 70 is in an operating system stage, the CPU 76 runs an analyzer, so that the CPU 76 accesses the load address and the branch instruction execution record set in the area for temporary storage and accesses a program debug symbol table in the memory 72, and finds an original source file, a function name, and line numbers of executed codes from the program debug symbol table according to the load address and the branch instruction execution record set to generate an analysis report, wherein the analysis report includes a program execution path and a program code coverage. A user views and analyzes the analysis report displayed on the user interface 78.

Figure 8:
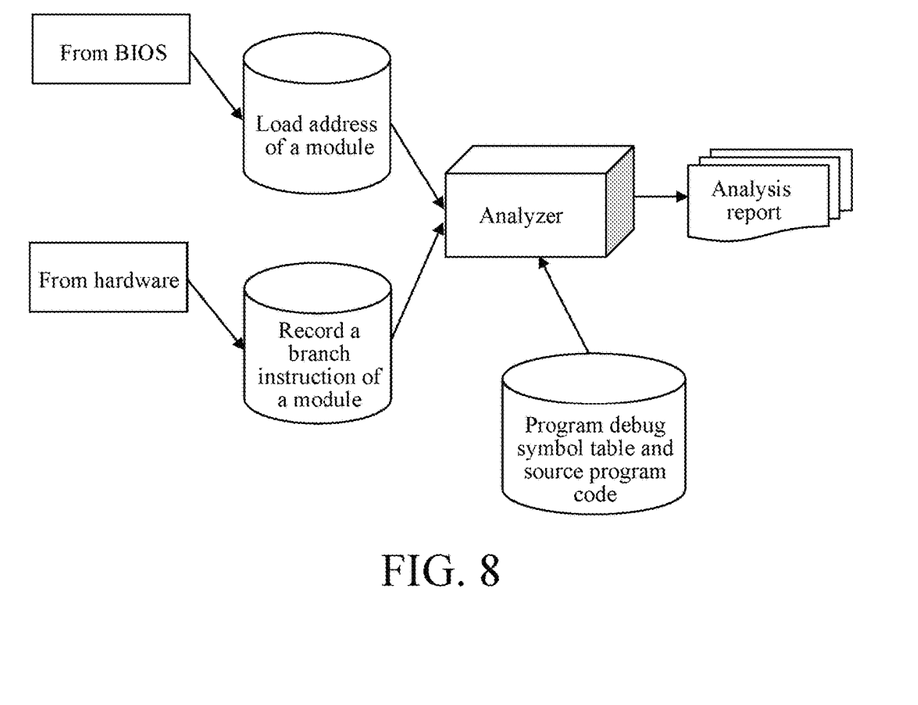
FIG. 8 is a schematic diagram of software implementation for debugging firmware/software by generating trace data according to the second embodiment of the present invention.

FIG. 8 is a schematic diagram of software implementation for debugging firmware/software by generating trace data according to the second embodiment of the present invention. Refer to components of FIG. 7 when process steps of FIG. 8 are described.

In FIG. 8, in a power-on stage, the CPU 76 runs a debug module, to configure an area of the memory 72 used for temporary storage, traces and records a power-on procedure of the BIOS by using limited storage space, and records a load address and a branch instruction execution record set of an interested tested module of a user into the area for temporary storage.

The CPU 76 runs the tested module, and records, into the area for temporary storage, the load address of the tested module loaded in the memory 72 and the branch instruction execution record set that includes a plurality of branch instruction execution records that record addresses before and after a branch instruction is executed.

In an operating system stage, an analyzer of the test system 70 accesses the load address and the branch instruction execution record set in the area for temporary storage and accesses a program debug symbol table in the memory 72, wherein the program debug symbol table is generated when source program code is compiled.

The analyzer finds an original source file, a function name, and line numbers of executed codes from the program debug symbol table according to the load address and the branch instruction execution record set to generate an analysis report, wherein the analysis report includes a program execution path and a program code coverage. A user may view and analyze the analysis report displayed on the user interface 78 of the test system 70.

In the present invention, the method for debugging firmware/software by generating trace data may be implemented by writing a program, and the program may be stored in a recording medium, when a system for debugging firmware/software by generating trace data loads the program from the recording medium and runs the program, the method steps shown in the foregoing descriptions and the accompanying drawings are implemented.

The foregoing method of the present invention may be implemented by a computer program product storing a program, and after a system for debugging firmware/software by generating trace data downloads the program from a network and runs the program, the method steps shown in the foregoing descriptions and the accompanying drawings are implemented.

The present invention provides a system and a method for debugging firmware/software by generating trace data, a recording medium, and a computer program product, wherein debug trace can be performed on a module of an embedded system such as the BIOS or Android, so as to achieve a new solution of performing debug trace on a module of an embedded system, that is, without needing to change program code of the module of the embedded system, turning on or off of a branch trace function can be controlled in real time from a remote end, and a size of storage space is set; a program designer may trace and record a power-on procedure of the embedded system for only an interested module by using limited storage space, and can perform data analysis in real time.

The present invention is described above with reference to preferred embodiments and exemplary accompanying drawings, which however should not be regarded as limitations. Modifications, omissions, and variations made by a person skilled in the art on formations and embodiments of the present invention shall fall within the claim scope of the patent scope of the present invention.

What is claimed is:

1. A method for debugging firmware/software by generating trace data, the method comprising the following steps:
    running a debug tool program in a main control system, running a debug engine in a power-on stage in a test system to configure an area of a first memory used for temporary storage, and recording a load address and a branch instruction execution record set into the area for temporary storage, wherein the load address is an address of a module, which is loaded in the first memory, of an embedded system, and the branch instruction execution record set comprises a plurality of branch instruction execution records that record addresses before and after a branch instruction is executed;
    sending, by the main control system, a debug instruction to the test system, to collect the load address and the branch instruction execution record set in the area for temporary storage of the test system and store the load address and the branch instruction execution record set in a second memory;
    accessing, by an analyzer of the main control system, the load address, the branch instruction execution record set, and a program debug symbol table in the second memory, wherein the program debug symbol table is generated when source program code of the embedded system is compiled; and
    finding, by the analyzer, an original source file, a function name, and line numbers of executed codes from the program debug symbol table according to the load address and the branch instruction execution record set to generate an analysis report, wherein the analysis report comprises a program execution path and a program code coverage.

2. The method according to claim 1, wherein the step of running the debug engine in the power-on stage in the test system further comprises the following steps:
    running, by the test system, the debug engine to configure the area for temporary storage, and recording the load address and the branch instruction execution record set into the area for temporary storage;
    running, by the test system, a power-on program, and waiting to connect to the main control system;
    connecting, by the test system, to the main control system;
    waiting, by the test system, for the main control system to send the debug instruction; and
    executing, by the test system, the debug instruction.

3. The method according to claim 1, wherein the step of running the debug tool program in the main control system further comprises the following steps:
    running, by the main control system, the debug tool program, to display debug selection options on a user interface;
    waiting, by the main control system, for the test system to be ready for connection;
    connecting, by the main control system, to the test system;
    selecting a to-be-debugged module on the debug selection options; and
    transferring, by the main control system, a debug instruction corresponding to the to-be-debugged module to the test system, wherein the debug instruction is generated by running the debug tool program by the main control system.

4. The method according to claim 1, wherein the step of accessing, by the analyzer, the load address, the branch instruction execution record set, and the program debug symbol table in the second memory comprises the following steps:
    sending a collection request to the main control system, and collecting, by the main control system, the load address and the branch instruction execution record set in the area for temporary storage of the test system;
    determining whether a new module is loaded in the test system;
    transferring, by the main control system, the debug instruction to the test system, to collect data stored in the area for temporary storage into a debug file; and
    attaching, by the main control system, a collected load address and a collected branch instruction execution record set of the new module to the debug file.

5. The method according to claim 1, wherein the step of finding, by the analyzer, the original source file, the function name, and the line numbers of executed codes from the program debug symbol table according to the load address and the branch instruction execution record set, to generate the analysis report comprises the following steps:
    sending an analysis request to the main control system;
    transferring, by the main control system, the debug instruction to the test system according to the analysis request, to collect the load address and the branch instruction execution record set in the area for temporary storage;
    compiling, by the main control system, the source program code to generate the program debug symbol table, and finding the original source file, the function name, and the line numbers of executed codes from the program debug symbol table according to the load address and the branch instruction execution record set, to generate the analysis report; and
    displaying the analysis report on a user interface of the main control system.

6. A system for debugging firmware/software by generating trace data, the system comprising:
    a test system, comprising:
        a first memory;
        a flash memory, for storing an embedded system; and
        a first central processing unit (CPU), for running a debug engine in a power-on stage to configure an area of the first memory used for temporary storage, recording a load address and a branch instruction execution record set into the area for temporary storage, and receiving a debug instruction to transfer the load address and the branch instruction execution record set in the area for temporary storage, wherein the load address is an address of a module, which is loaded in the first memory, of the embedded system, and the branch instruction execution record set comprises a plurality of branch instruction execution records that record addresses before and after a branch instruction is executed; and a main control system, comprising:
- a second memory, for storing a program debug symbol table and source program code of the embedded system, wherein the program debug symbol table is generated when the source program code is compiled; and
- a second CPU, for running a debug tool program to send the debug instruction to the test system and to collect the load address and the branch instruction execution record set in the area for temporary storage of the test system, running an analyzer to access the load address, the branch instruction execution record set, and the program debug symbol table in the second memory, and finding an original source file, a function name, and line numbers of executed codes from the program debug symbol table according to the load address and the branch instruction execution record set to generate an analysis report, wherein the analysis report comprises a program execution path and a program code coverage.

7. The system according to claim 6, wherein the test system further comprises a first transmission interface, and by using the first transmission interface, the first CPU receives the debug instruction transferred by the main control system and transfers the load address and the branch instruction execution record set of the module to the main control system.

8. The system according to claim 6, wherein the main control system further comprises:
- a second transmission interface, wherein, by using the second transmission interface, the second CPU transfers the debug instruction to the test system and receives the load address and the branch instruction execution record set transferred by the test system; and
- a user interface, for displaying debug selection options for selecting a to-be-debugged module, to generate a debug instruction corresponding to the to-be-debugged module, and displaying the analysis report.

9. A method for debugging firmware/software by generating trace data, the method comprising the following steps:
- running a debug module in a power-on stage in a test system, to configure an area of a memory used for temporary storage;
- running, by the test system, a module of an embedded system, and recording a load address and a branch instruction execution record set of the module into the area for temporary storage, wherein the load address is an address of the module loaded in the memory, and the branch instruction execution record set comprises a plurality of branch instruction execution records that record addresses before and after a branch instruction is executed;
- accessing, by an analyzer of the test system, the load address and the branch instruction execution record set in an operating system stage in the area for temporary storage, and accessing in the memory a program debug symbol table address and source program code of the embedded system, wherein the program debug symbol table is generated when the source program code is compiled; and
- finding, by the analyzer, an original source file, a function name, and line numbers of executed codes from the program debug symbol table according to the load address and the branch instruction execution record set to generate an analysis report, wherein the analysis report comprises a program execution path and a program code coverage.

10. The method according to claim 9, further comprising the following step: displaying the analysis report on a user interface of the test system.

11. A system for debugging firmware/software by generating trace data, the system comprising:
- a memory, for storing a program debug symbol table and source program code of an embedded system, wherein the program debug symbol table is generated when the source program code is compiled;
- a flash memory, for storing an embedded system; and
- a central processing unit (CPU), for running a debug module in a power-on stage to configure an area of the memory used for temporary storage, running a module of an embedded system, recording a load address and a branch instruction execution record set into the area for temporary storage, running an analyzer in an operating system stage in a test system, to access the load address and the branch instruction execution record set in the area for temporary storage, and access the program debug symbol table in the memory, and finding an original source file, a function name, and line numbers of executed codes from the program debug symbol table according to the load address and the branch instruction execution record set, to generate an analysis report that comprises a program execution path and a program code coverage, wherein the load address is an address of the module loaded in the memory, and the branch instruction execution record set comprises a plurality of branch instruction execution records that record addresses before and after a branch instruction is executed.

12. The system according to claim 11, further comprising:
a user interface, for displaying debug selection options for selecting a to-be-debugged module, wherein the CPU displays the analysis report on the user interface according to the selected to-be-debugged module.

* * * * *